(12) United States Patent
Mowatt et al.

(10) Patent No.: US 8,321,444 B2
(45) Date of Patent: Nov. 27, 2012

(54) FEDERATED SEARCH

(75) Inventors: David Mowatt, Seattle, WA (US); Arun Krishnamoorthy, Sammamish, WA (US); Niket K. Patwardhan, Redmond, WA (US); Puneet Narula, Bothell, WA (US); Thomas M. Laird-McConnell, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 526 days.

(21) Appl. No.: 11/771,812

(22) Filed: Jun. 29, 2007

(65) Prior Publication Data
US 2009/0006332 A1 Jan. 1, 2009

(51) Int. Cl.
*G06F 17/30* (2006.01)
(52) U.S. Cl. .................................. 707/763; 707/759
(58) Field of Classification Search .................. None
See application file for complete search history.

(56) References Cited

U.S. PATENT DOCUMENTS

| | | | |
|---|---|---|---|
| 6,233,586 B1 * | 5/2001 | Chang et al. ............................. 1/1 |
| 6,370,527 B1 | 4/2002 | Singhal |
| 6,370,541 B1 | 4/2002 | Chou et al. |
| 6,578,046 B2 | 6/2003 | Chang et al. |
| 6,792,416 B2 | 9/2004 | Soetarman et al. |
| 6,944,612 B2 | 9/2005 | Roustant et al. |
| 7,099,946 B2 | 8/2006 | Lennon et al. |
| 7,177,862 B2 | 2/2007 | Zhang et al. |
| 7,197,491 B1 | 3/2007 | Chou et al. |
| 2003/0110164 A1 * | 6/2003 | Kappell et al. ..................... 707/3 |
| 2004/0068486 A1 | 4/2004 | Chidlovskii |
| 2005/0038775 A1 | 2/2005 | Haveliwala et al. |
| 2006/0129530 A1 | 6/2006 | Beavers et al. |
| 2006/0161544 A1 | 7/2006 | Lee et al. |
| 2006/0195420 A1 | 8/2006 | Kilroy |
| 2006/0287985 A1 * | 12/2006 | Castro et al. ....................... 707/3 |
| 2007/0005574 A1 | 1/2007 | Crispo et al. |
| 2007/0061302 A1 | 3/2007 | Ramer et al. |
| 2007/0073663 A1 | 3/2007 | McVeigh et al. |
| 2007/0118520 A1 * | 5/2007 | Bliss et al. ......................... 707/5 |
| 2007/0198495 A1 * | 8/2007 | Buron et al. ....................... 707/3 |
| 2007/0250486 A1 * | 10/2007 | Liao et al. .......................... 707/3 |
| 2008/0168033 A1 * | 7/2008 | Ott et al. ............................. 707/3 |
| 2008/0172357 A1 * | 7/2008 | Rechis et al. ...................... 707/2 |

FOREIGN PATENT DOCUMENTS

WO 0203244 A2 1/2002

OTHER PUBLICATIONS

Meng et al. "Building Efficient and Effective Metasearch Engines" ACM Computing Surveys, vol. 34, No. 1, Mar. 2002, pp. 48-89.*
Meng et al. "Building Efficient and Effective Metasearch Engines" ACM Computing Surveys, vol. 34, No. 1, Mar. 2002, pp. 1-50.*
Somani, et al., "Bringing together content and data management systems: Challenges and opportunities",vol. 41, No. 4, 2002, pp. 686-696.

(Continued)

*Primary Examiner* — Kuen S Lu
*Assistant Examiner* — Berhanu Mitiku (57) ABSTRACT

Various techniques are disclosed to permit searching several locations with one query. Locations may include web search sites, subscription-only sites, line of business applications, or other searchable data repositories. The query may be modified to provide the required format or other information for each location to perform a search.

18 Claims, 6 Drawing Sheets

OTHER PUBLICATIONS

Kerschberg, et al., "Knowledge Sifter: Agent-Based Ontology-Driven Search over Heterogeneous Databases using Semantic Web Services", E-Center for E-Business, George Mason University, Fairfax, VA, USA, vol. 3226/2004 ,2004. pp. 276-293.

Sauter, et al., "Information service patterns, Part 1: Data federation pattern", Jul. 28, 2006. http://www-128.ibm.com/developerworks/webservices/library/ws-soa-infoserv1/.

International Search Report PCT/US2008/067573. Mailed Nov. 28, 2008. 11 Pages.

Chinese PT Application 200880022412.8; First Office Action dated Dec. 19, 2011.

"European Search Report", Mailed Date: Dec. 13, 2010, Application No. EP/08771528, Filed Date: Dec. 13, 2010, pp. 10.

Thomas, P.A., "From Library Card Index to International Online Database: The Development of ICR", International Online Information Meeting Proceedings; Dec. 8, 1987; pp. 77-86.

Chakravarti, A.K. et al., "Technology Alert Patent Search System in Electronics", World Patent Information, vol. 18, Issue 04, Dec. 1, 1996, p. 249; Amsterdam, NL.

Tiers, Van Dyke G, "Patents Alert", Journal of Fluorine Chemistry, vol. 90, Issue 01, Jun. 26, 1998, pp. 101-105; Elsevier, NL.

Meng, et al., "Building Efficient and Effective Metasearch Engines", Retrieved at <<http://www.cs.binghamton.edu/~meng/pub.d/meng-survey.pdf>>, ACM Computing Surveys , vol. 34, Issue 01, Mar. 1, 2002, pp. 48-89, New York, NY.

\* cited by examiner

FEDERATED SEARCH

BACKGROUND

In the course of day-to-day work, users often need to access information stored in various content repositories such as line of business applications, on-line newspapers, and web-based research sites. Finding the information stored in these content repositories involves searching multiple applications and sites, generally by loading a web page or an application associated with the desired information, performing a search, and then repeating this process for each content repository.

Web search sites index web pages to facilitate searching, but not all sites can be indexed with this method. For example, subscription sites may allow queries but not indexing, and many on-line stores that dynamically build product information pages from information in databases cannot be indexed, although they may be searched.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In accordance with one implementation presented herein, software such as an operating system-based search application (herein known as "originating software") running on a client computer allows a selection from a set of content repositories, or "locations," to be searched. The originating software parses a query, may modify the content and syntax of the query to match the requirements for each of the selected locations, and submit queries to each of the locations through an appropriate programmatic interface, such as WebDAV, adding a query to a URL, or the like. Each of the locations then performs a search and returns the results to the originating software. A user interface is provided, allowing the returned results from each of the locations to be displayed. Some implementations allow for any number of different search applications to send queries to any number of locations.

Not all locations may allow all originating software to query them directly. For example, to enhance security, an enterprise may only allow certain servers and services, such as a particular intranet search portal, access to an authorization and authentication server that grants access to a particular location, such as a human resources database search engine. In an example, an intranet search portal may be allowed to search a particular location, but an operating system-based search application may not be allowed to search the particular location.

Some implementations described herein provide solutions to let the originating software send queries to the particular location via an internet search portal. In this example, the originating software would submit a query and a user's security credentials to the intranet search portal. The intranet search portal would access an authorization and authentication server, and obtain appropriate security credentials to access the human resources database search engine. The internet search portal would then submit the search with the appropriate credentials to the human resources database search engine, obtain results, and return the results to the originating software.

In some implementations a location B may, in response to a request from a location A, give information about other locations it can access, herein called "self-description." Some implementation may also allow "nesting," where, using the previous example, location B may request further request from a location C, that location B can access, a list of other locations that C can access, and return this list of location to location A. This nesting may be repeated for any or all of the locations accessible directly or indirectly, i.e. through another location, from location A.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of example implementations and is not intended to represent the only forms in federated search may be constructed or utilized. The description sets forth the functions of example implementations and the sequence of steps for constructing and operating the examples. However, the same or equivalent functions and sequences may be accomplished by alternate implementations. Like numerals refer to like parts in the accompanying drawings.

Described herein are, among other things, examples of various technologies and techniques that allow federated search. Although the examples are described and illustrated herein as being implemented in a personal computer system, the system described is provided as an example and not a limitation. As those skilled in the art will appreciate, the present examples are suitable for application in a variety of different types of systems.

In some implementations of systems containing a query federator module (QFM), a user interface is provided, allowing an original query to be entered. Such a user interface may contain one area to enter an original query, one or more areas to display returned results, and a way to select which locations should be queried, herein known as "selected locations" out of a set of possible locations. The set of locations may be determined in a number of manners including but not limited to what an end-user selects and configures, or by what an administrator may configure via an administrative user interface.

The original query is processed and analyzed by the QFM, and queries appropriate for each of the selected resources, or "processed queries" are created. A processed query may be an unmodified copy of the original query, or it may be modified in syntax or content. For example, an original query may contain a clause to find a result where a property called "title" contains the word "cloud." If a selected location has a property semantically equivalent to "title" but called "caption," the QFM may change the processed query to reference the property "caption" instead of "title". In another example, if an original query was entered using one syntax, and a selected location requires a different syntax, the QFM may provide a processed query matching the semantics of the original query but using the syntax of the selected location instead of the original query.

A processed query for each selected location is submitted to the respective selected location, and results are returned to the QFM. The results are then mapped back so that the metadata in them is consistent with what the original system expects. For example, if the results have properties with names of "Subject" and "Filename", they might be mapped to "Title" and "URL" so that the original system knows how to display these properties. The results are returned to and displayed in the user interface. The user interface may be divided into areas or sections corresponding to the selected location. In an alternate embodiment, all of the results may be displayed in one section of the user interface. Any interaction in the returned result portion of the user interface, such as a mouse click, is passed through to the location that provided that returned result. This allows, for example, a web search location to receive a click on a web page title and open the corresponding web page, or for a payroll application to receive a click on a name and open the corresponding payroll information.

Figure 1:
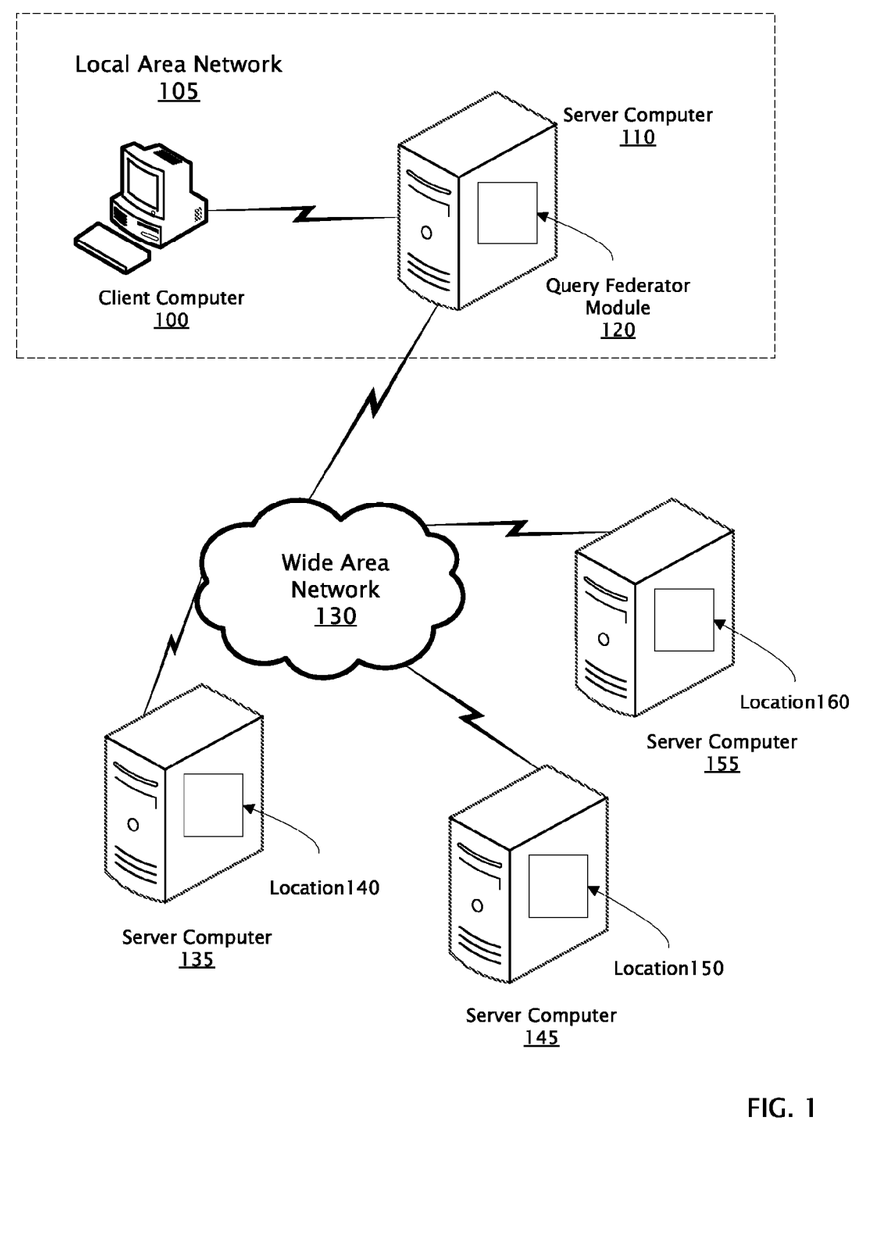
FIG. 1 is a block diagram of an example of an operating environment suitable for implementing federated search.

FIG. 1 is a generalized representation of one suitable operating environment 100 in which federated search may be carried out. The operating environment 100 includes client computer 100 connected to server computer 110 via local area network 105. In this instance, server computer 110 is hosting QFM 120.

Server computer 110 provides access to server computers 135, 145, and 155 through wide area network 130. Server computers 135,145,155 host locations 140, 150, 160 respectively.

Client computer 100 includes web browser software 210 (not shown). Web browser software 210 is accessing QFM 120. QFM 120 accesses locations 140,150, 160 to provide search results.

While this example shows client computer 100 as being connected to other locations through server computer 110, in other implementations client computer 100 may be connected to any number of locations directly, through a local area network, through a wide area network, a combination of both local area networks and wide area networks, or through any other type of connection that may be available. QFM may also be implemented directly on client computer 100, removing the need for server computer 110 in this example. Those skilled in the art will recognize that there are many other configurations capable of supporting a federated search.

Figure 2:
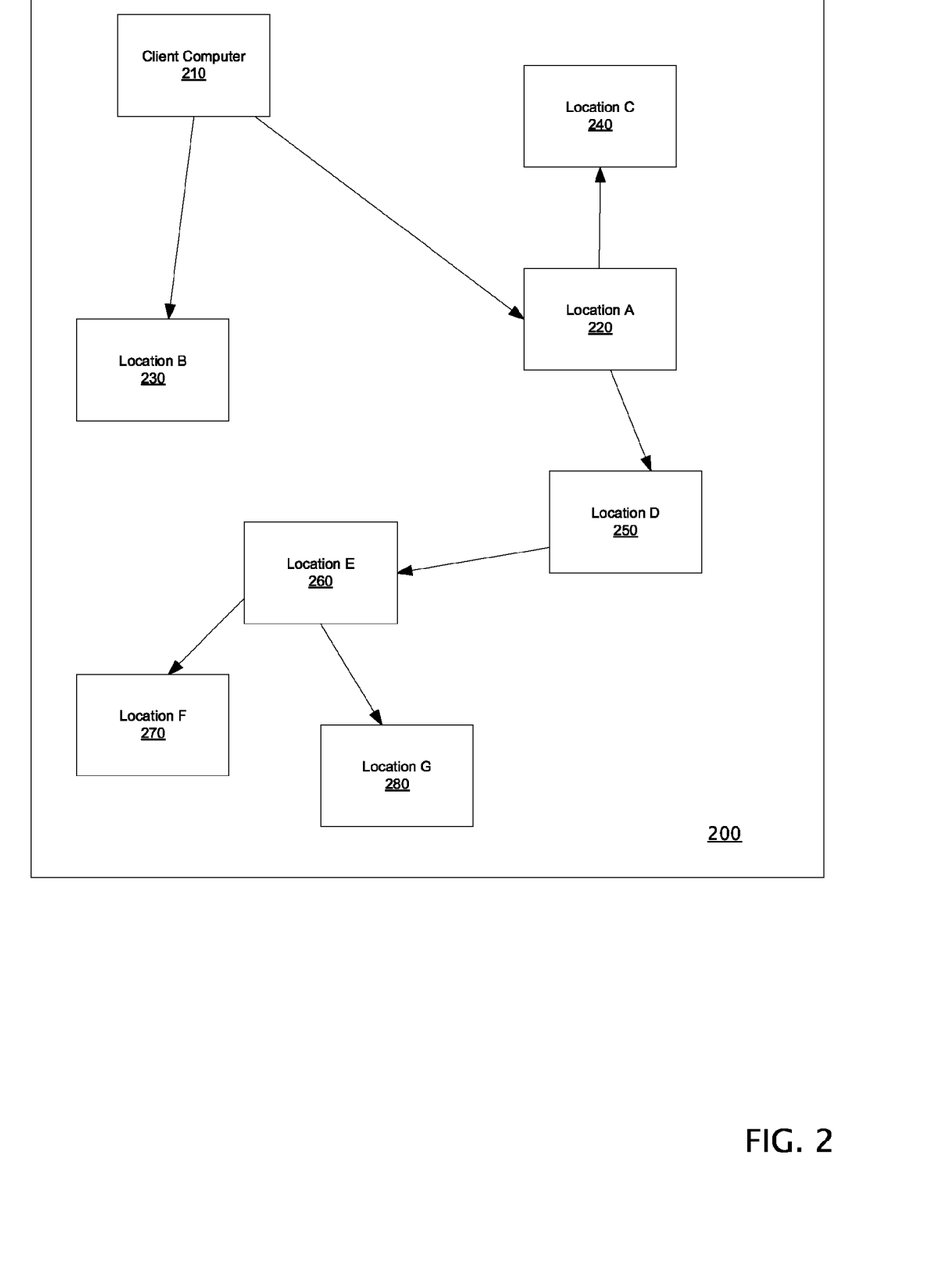
FIG. 2 is a block diagram showing an example of data flow for an outbound query.

FIG. 2 is a block diagram 200 of an example of an operating environment in which federated search may be implemented. In this example, client computer 210 submits a query to location A 220, and location B 230. Location A 220 has access to location C 240, and location D 250. Location A 220 will provide results it may produce for the query back to client computer 210, and will pass the query on to locations C 240 and D 250. Each of locations C 240 and D 250 will execute the query and return the results to location A 220, which will in turn pass the results back to client computer 210. This process continues with location D 250 passing the query on to location E 260, which in turn passes the query on to location F 270 and location G 280, with the results passed back up the path the query followed until client computer 210 receives all of the results. This nesting of locations may have different "depths" (involve more or fewer paths from the client computer) in other implementations, and there may be more or fewer locations at any "level" (the number of locations directly accessible from a location).

In some implementations, processing of queries to prepare them for execution by other locations may happen in a location passing a query to a next location. In other implementations, processing of queries may happen in client computer 210. In yet other implementations, one location may process queries for all other locations. Other implementations may centralize or distribute query processing in various ways.

In at least one implementation, user credentials will be passed along with a query, while in some other implementations, user credentials may not be used at all. In some implementations, user credentials may be used to obtain other security credentials that may be required for access to some locations. One skilled in the art will recognize that any security requirements may be handled in many different ways in different implementations.

Figure 3:
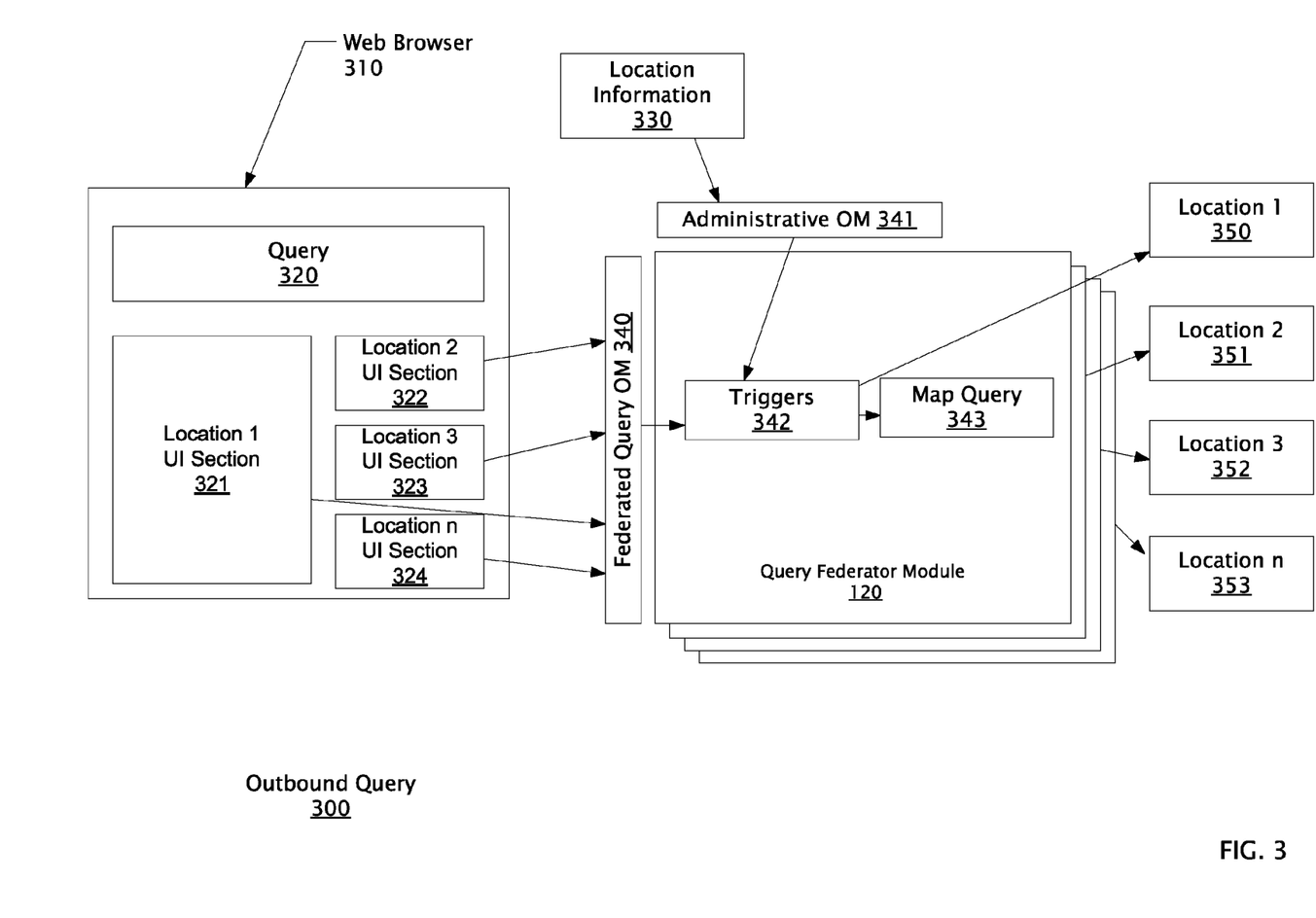
FIG. 3 is a block diagram showing an example of data flow for returning results from a query.

FIG. 3 is a block diagram showing an example of data flow 300 for an outbound query. Web browser 310 is displaying a web page with a section containing query 320, and UI sections 321, 322, 323, 324 for locations 1, 2, 3 and n. Query 320 is sent to each of the location UI sections, which forward it on to federated query object manager 340.

An administrative object manager 341 provides location information 330 to QFM. This location information 330 is used to determine if a location 350, 351, 352, 353 should be searched (or called) based on triggers module 342. Triggers module 342 may include criteria such as whether the query 320 language can be matched to what a location (350, 351, 352, 353) requires, whether certain keywords or patterns are contained in query 320, whether a location provides high confidence results for the type of data being queried, or any other criterion or combination of criteria that is implemented.

Once a location to be called has been determined, the query 320 is mapped by map query module 343 to provide a processed query to match the location's requirements. For example, if the original query had referred to a field named "author" and the location had a similar field but it was named "name," the map query module 343 would provide a processed query referring to "name" rather than "author." In another example, if the original query used a different syntax for a query than the location did, map query module 343 would provide a processed query with an appropriate syntax for the location. In yet another example, map query module may update authentication information to allow access to the location. One skilled in the art will recognize that there are many ways that a query may need to be mapped to match a location's requirements. Once mapped, the processed query is submitted to the location. The triggers module and query map module are implemented for each of the selected locations.

In this example, location 1, location 2, location 3, and location n (350, 351, 352, 353) each receive processed queries. There may be any number of locations in other implementations. While this implementation shows the triggers module and query map module residing in the QFM, the function provided by these modules could be performed outside QFM, on other devices, or in different orders than those described herein.

Figure 4:
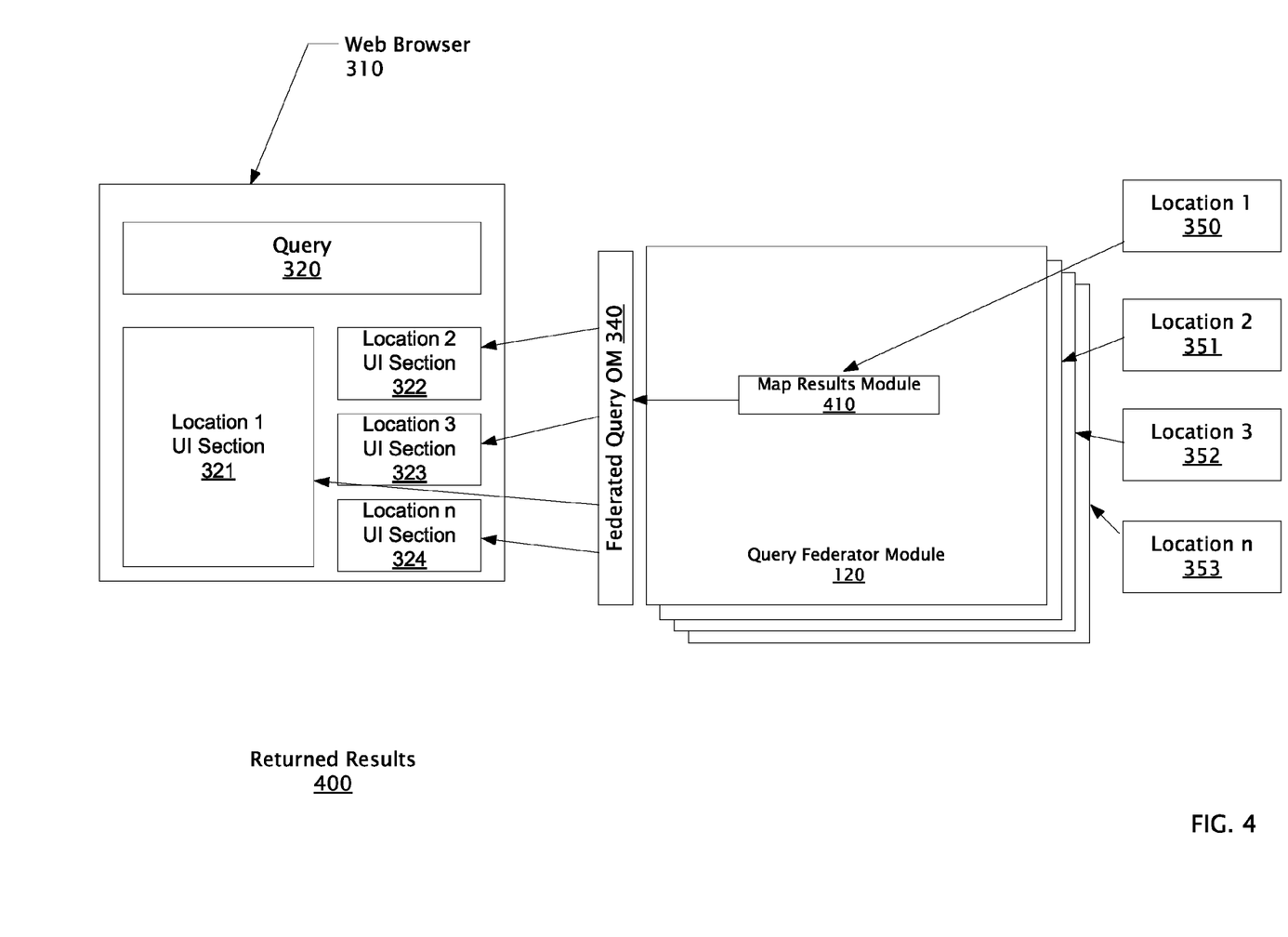
FIG. 4 is a flow chart showing a method to process a query in one example of an implementation of federated search.

FIG. 4 is a block diagram showing an example of data flow 400 for returning results from a query. Locations 1 through n (350, 351, 352, 353) return results from query 320 to QFM 120. Map results module 410 receives the results, and maps them back to match the original query. Mapping the results may involve changing field names or data formatting, or any other processing that makes the returned results useful to the web page or other display that may be receiving the returned results. In this example, map results module 410 passes the mapped results back to the federated query object manager 340, which passes them back to the corresponding location UI sections 321, 322, 323, 324.

While the flowcharts described below show a particular ordering of steps, in other implementations steps may be performed in different orders than those shown, while in some implementations some steps may be performed simultaneously with other steps.

Figure 5:
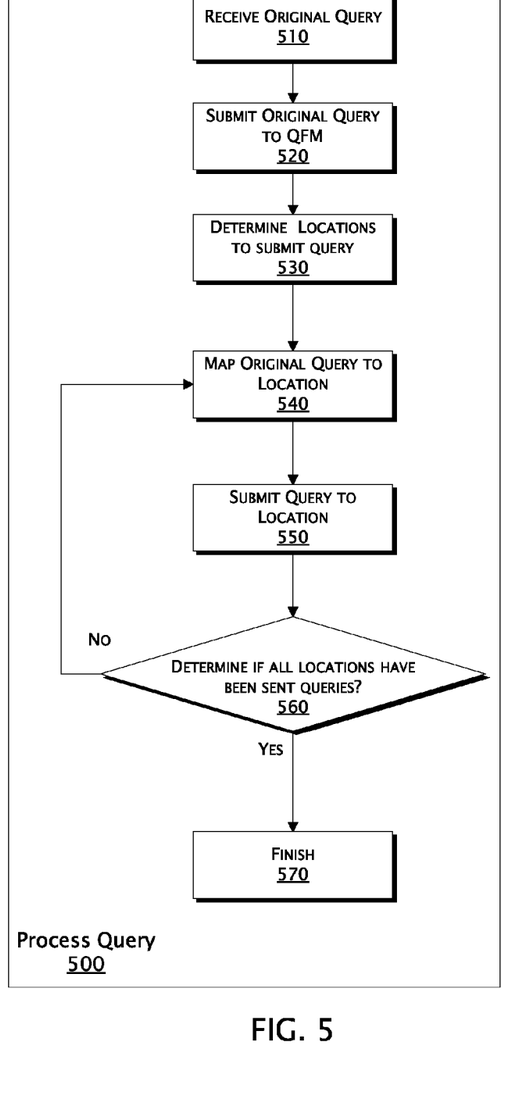
FIG. 5 is a block diagram of an example of an operating environment in which federated search may be implemented.

FIG. 5 is a flow chart showing a method 500 to process a query in one example of an implementation of federated search. An original query is received 510, and submitted 520 to QFM 120. Selected locations to query are determined 530. This determination 530 may be made by selecting locations from a list provided by a software application, or may be made automatically by QFM 120 using location information 330 about locations available to be selected. The original query is mapped 540 to a location, and the query is submitted 550. If it is determined 560 Yes that any selected locations have not had queries submitted, the steps of mapping query 540, submitting query 550, and determining 560 if other selected locations have not had queries submitted are repeated. Once all selected locations have had a query submitted 560 No, the query submission is finished 570.

Figure 6:
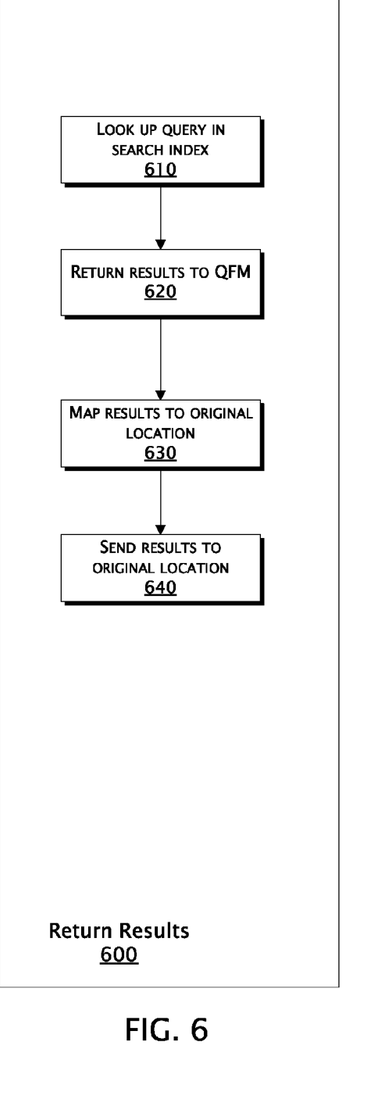
FIG. 6 is a flow chart showing a method to process to return results in one example of an implementation of federated search.

FIG. 6 is a flow chart showing a method 600 to process to return results in one example of an implementation of federated search. Each selected location determine in step 530 may use a process similar to this when returning results. A query is looked up 610 in a search index. Results are returned 620 to QFM 120, which maps 630 the results back to the original location. In this example, the mapping is performed by a map results module 410. The results are sent 640 to the original location.

Figure 7:
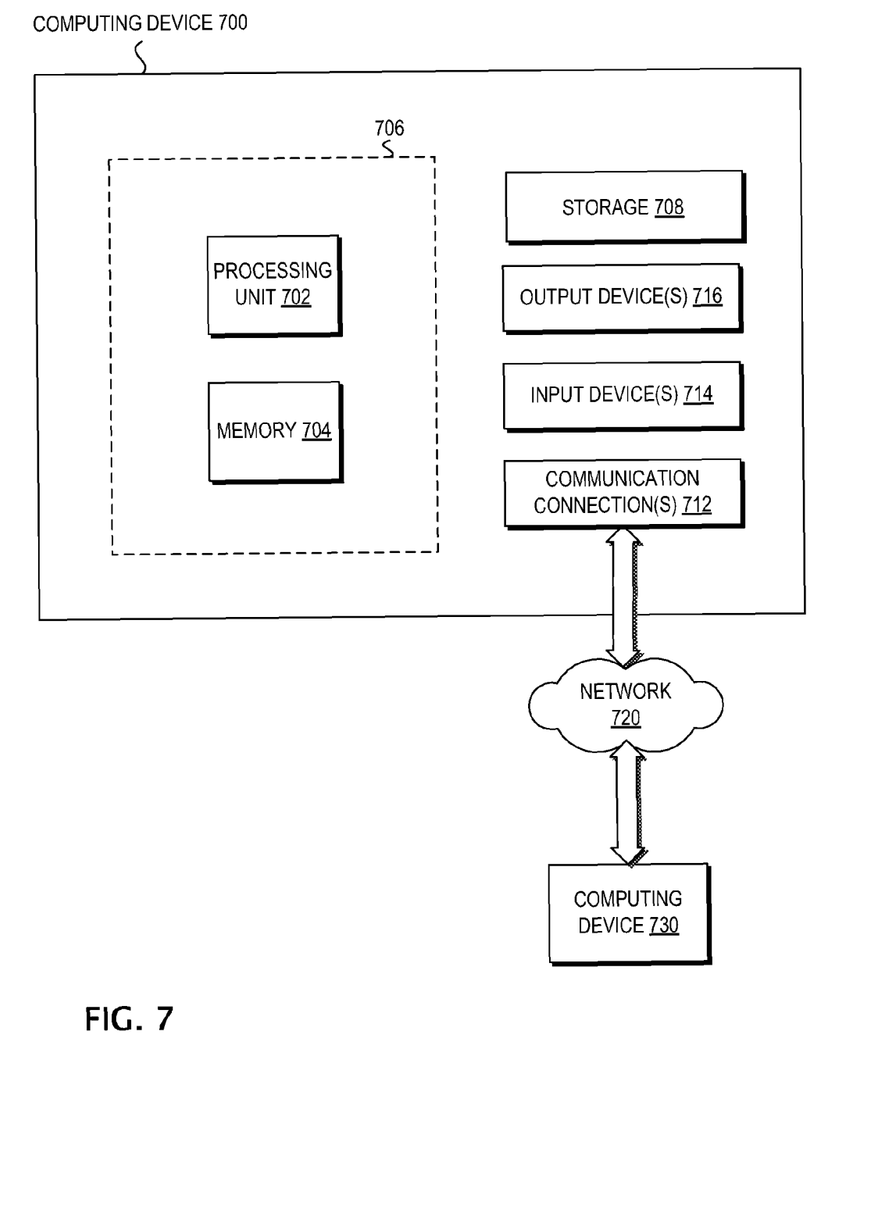
FIG. 7 is a block diagram of an example of a system on which federated search may be implemented.

FIG. 7 and the following discussion are intended to provide a brief, general description of a suitable computing environment to implement embodiments of techniques and technologies for Federated search. The operating environment of FIG. 7 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention will be described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 shows an example of a computing device 700 for implementing one or more embodiments of the invention. In one configuration, computing device 700 includes at least one processing unit 702 and memory 704. Depending on the exact configuration and type of computing device, memory 704 may be volatile (such as RAM), non-volatile (such as ROM, flash memory, etc.) or some combination of the two. This configuration is illustrated in FIG. 7 by dashed line 706.

In other embodiments, device 700 may include additional features and/or functionality. For example, device 700 may also include additional storage (e.g., removable and/or non-removable) including, but not limited to, magnetic storage, optical storage, and the like. Such additional storage is illustrated in FIG. 7 by storage 708. In one embodiment, computer readable instructions to implement embodiments of the invention may be in storage 708. Storage 708 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 704 and storage 708 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 700. Any such computer storage media may be part of device 700.

Device 700 may also include communication connection(s) 712 that allow device 700 to communicate with other devices. Communication connection(s) 712 may include, but is not limited to, a modem, a Network Interface Card (NIC), or other interfaces for connecting computing device 700 to other computing devices. Communication connection(s) 712 may include a wired connection or a wireless connection. Communication connection(s) 712 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 700 may include input device(s) 714 such as keyboard, mouse, pen, voice input device, touch input device, infrared cameras, video input devices, and/or any other input device. Output device(s) 716 such as one or more displays, speakers, printers, and/or any other output device may also be included in device 700. Input device(s) 714 and output device(s) 716 may be connected to device 700 via a wired connection, wireless connection, or any combination thereof. In one embodiment, an input device or an output device from another computing device may be used as input device(s) 714 or output device(s) 716 for computing device 700.

Components of computing device 700 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 700 may be interconnected by a network. For example, memory 704 may be comprised of multiple physical memory units located in different physical locations interconnected by a network.

Those skilled in the art will realize that storage devices utilized to store computer readable instructions may be distributed across a network. For example, a computing device 730 accessible via network 720 may store computer readable instructions to implement one or more embodiments of the invention. Computing device 700 may access computing device 730 and download a part or all of the computer readable instructions for execution. Alternatively, computing device 700 may download pieces of the computer readable instructions, as needed, or some instructions may be executed at computing device 700 and some at computing device 730. Those skilled in the art will also realize that all or a portion of the computer readable instructions may be carried out by a dedicated circuit, such as a Digital Signal Processor (DSP), programmable logic array, and the like.

The invention claimed is:

1. A method for searching comprising:
   receiving an original query;
   storing criteria for querying a plurality of content storage locations;
   selecting one or more of the plurality of content storage locations to search based on whether the original query meets the criteria for querying the plurality of content storage locations, the selected content storage locations comprising less than all of the plurality of content storage locations;
   mapping the original query to provide one or more processed queries for querying the selected content storage locations, wherein the processed queries comprise modifications to the original query to match requirements for querying the selected content storage locations, an individual modification comprising a field name in the original query that is replaced with a different field name in a first one of the processed queries, wherein the different field name is particular to a first one of the selected content storage locations to which the first processed query is submitted;
   submitting the processed queries to the selected content storage locations, including submitting the first processed query with the different field name to the first selected content storage location and at least one other processed query to another selected content storage location;
   receiving search results of the processed queries from the selected content storage locations;
   mapping the search results of the processed queries to match the original query; and
   providing the mapped search results of the processed queries in response to the original query,
   wherein at least the mapping the original query is performed by a computing device.

2. The method of claim 1 wherein the search results received from the first selected content storage location include results from at least one other content storage location.

3. The method of claim 1 further comprising displaying the mapped search results in a user interface.

4. The method of claim 3, wherein the user interface is divided into sections corresponding to the selected content storage locations, and the mapped search results are displayed in different individual sections of the user interface that correspond to individual selected content storage locations from which the mapped search results are received.

5. The method of claim 3, wherein the displaying comprises displaying the mapped search results received from at least two of the selected content storage locations together in one section of the user interface.

6. A computer readable memory device or storage device containing instructions thereon that, when executed, perform the method of claim 1.

7. The method of claim 1, wherein the submitting includes submitting a second one of the processed queries to a second one of the selected content storage locations that forwards the second processed query to a third selected content storage location.

8. A system comprising:
   one or more modules comprising executable instructions configured to: receive an original query;
   select a first content storage location and a second content storage location to search with the original query;
   map the original query to the first content storage location to provide a first processed query matching one or more search requirements of the first content storage location by replacing a field name in the original query with a different field name in the first processed query;
   map the original query to the second content storage location by modifying the original query to provide a second processed query matching one or more search requirements of the second content storage location;
   submit the first processed query including the different field name to the first content storage location and submit the second processed query to the second content storage location;
   receive first results of the first processed query, and second results of the second processed query; and
   map a property of the first results query or the second results to a different property associated with the original query; and
   a processor configured to execute the one or more modules.

9. The system of claim 8, wherein the one or more modules are configured to submit the processed query to the first content storage location via at least one other location.

10. The method of claim 1, wherein the criteria reflect language patterns, the method further comprising matching the language patterns to the original query to select the content storage locations to search.

11. The method of claim 1, wherein the criteria reflect a level of confidence for results provided by the plurality of content storage locations for different types of queries, the method further comprising using the level of confidence to select the content storage locations to search.

12. The method of claim 1, the field name in the original query being semantically equivalent to the different field name in the first processed query.

13. The method of claim 12, the field name in the original query being called title and the different field name in the first processed query being called caption.

14. The system according to claim 8, the field name in the original query being semantically equivalent to the different field name in the first processed query.

15. A method comprising:
   receiving an original query from an original location;
   identifying a plurality of content storage locations to search with the original query, individual content storage locations having different requirements for querying the individual content storage locations;

mapping the original query to the plurality of content storage locations by providing at least two different processed queries for querying the individual content storage locations, wherein the at least two different processed queries are provided by modifying the original query to match the different requirements for querying the individual content storage locations;

submitting the at least two different processed queries to the individual content storage locations having the different requirements;

receiving search results of the at least two different processed queries from the individual content storage locations having the different requirements;

mapping the search results back to the original location by changing field names of the search results or changing data formatting of the search results; and after mapping the search results providing the search results of the at least two different processed queries to the original location in response to the original query, wherein at least the mapping the original query is performed by a computing device.

16. The method according to claim 15, wherein the at least two different processed queries include at least two different modified versions of the original query and an unmodified copy of the original query.

17. The method according to claim 15, wherein an individual processed query has different syntax than the original query.

18. A computer readable memory device or storage device containing instructions thereon that, when executed, perform the method of claim 15.

* * * * *